(12) United States Patent
Kondo et al.

(10) Patent No.: US 7,857,461 B2
(45) Date of Patent: Dec. 28, 2010

(54) PROJECTOR AND PROJECTION METHOD

(75) Inventors: Satoshi Kondo, Kyoto (JP); Takafumi Aoki, Miyagi (JP); Toru Takahashi, Miyagi (JP)

(73) Assignee: Panasonic Corporation, Osaka (JP)

( * ) Notice: Subject to any disclaimer, the term of this patent is extended or adjusted under 35 U.S.C. 154(b) by 274 days.

(21) Appl. No.: 12/265,957

(22) Filed: Nov. 6, 2008

(65) Prior Publication Data

US 2009/0115916 A1 May 7, 2009

(30) Foreign Application Priority Data

Nov. 6, 2007  (JP) ............... 2007-288348
Oct. 31, 2008  (JP) ............... 2008-282242

(51) Int. Cl.
*G03B 21/14* (2006.01)
(52) U.S. Cl. ............... 353/69; 353/79; 353/121
(58) Field of Classification Search ............... 353/7, 353/10, 69, 70, 79, 121, 122; 345/419–428
See application file for complete search history.

(56) References Cited

U.S. PATENT DOCUMENTS

| 7,104,653 | B2 | 9/2006 | Moriwaki et al. | |
|---|---|---|---|---|
| 7,352,340 | B2 * | 4/2008 | Utt et al. | 345/32 |
| 2004/0257366 | A1 | 12/2004 | Moriwaki et al. | |
| 2004/0257540 | A1 * | 12/2004 | Roy et al. | 353/69 |
| 2005/0018144 | A1 * | 1/2005 | Wada et al. | 353/69 |
| 2007/0171382 | A1 * | 7/2007 | Tan et al. | 353/69 |
| 2007/0195285 | A1 * | 8/2007 | Jaynes et al. | 353/69 |

FOREIGN PATENT DOCUMENTS

| JP | 10-200836 | 7/1998 |
|---|---|---|
| JP | 2001-083949 | 3/2001 |
| JP | 2001-320652 | 11/2001 |

(Continued)

OTHER PUBLICATIONS

Takahashi et al., "A Geometric Correction Method for Projected Images Using SIFT Feature Points", 5$^{th}$ ACM/IEEE International Workshop on Projector-Camera Systems (PROCAMS2008), Aug. 2008.

(Continued)

*Primary Examiner*—William C Dowling
(74) *Attorney, Agent, or Firm*—Wenderoth, Lind & Ponack, LLP.

(57) ABSTRACT

A projector includes: an image capturing unit that captures an image of a projection target image (an original image or a corrected image) projected by the projector on a projection surface; a shape model hold unit that holds shape models; a model selection unit that selects a projection surface shape model based on correspondence relationships between first feature points on the projection target image and second feature points on the captured image; a parameter calculation unit that calculates a model parameter which is to be used to approximate a shape of the projection surface shape model to the shape of the projection surface and indicates a positional relationship between the projection surface and the projector, for each projection target image based on the correspondence relationships; a correction unit that corrects another original image; and a projection unit that projects the corrected image as another projection target image.

11 Claims, 13 Drawing Sheets

FOREIGN PATENT DOCUMENTS

| | | |
|---|---|---|
| JP | 2004-165944 | 6/2004 |
| JP | 2004-320662 | 11/2004 |
| JP | 2006-094458 | 4/2006 |

OTHER PUBLICATIONS

Takahashi et al., "Performance Evaluation of a Feature-Based Geometric Correction Method for Projected Images", The 7$^{th}$ Forum on Information Technology (FIT2008), No. RI-006, 3$^{rd}$ Volume, pp. 21-23, Sep. 2008 (including English Translation).

Takahashi et al., "An Experimental Study on Geometric Correction for Projected Images Using Feature Point Extraction", The 22$^{nd}$ SIP Symposium, No. A3-2, pp. 53-58, Nov. 2007 (including English translation).

Takahashi et al., "Image Correction Method for Multi-Projector Display Using SIFT Features", SIGGRAPH Asia 2008, Dec. 2008.

* cited by examiner

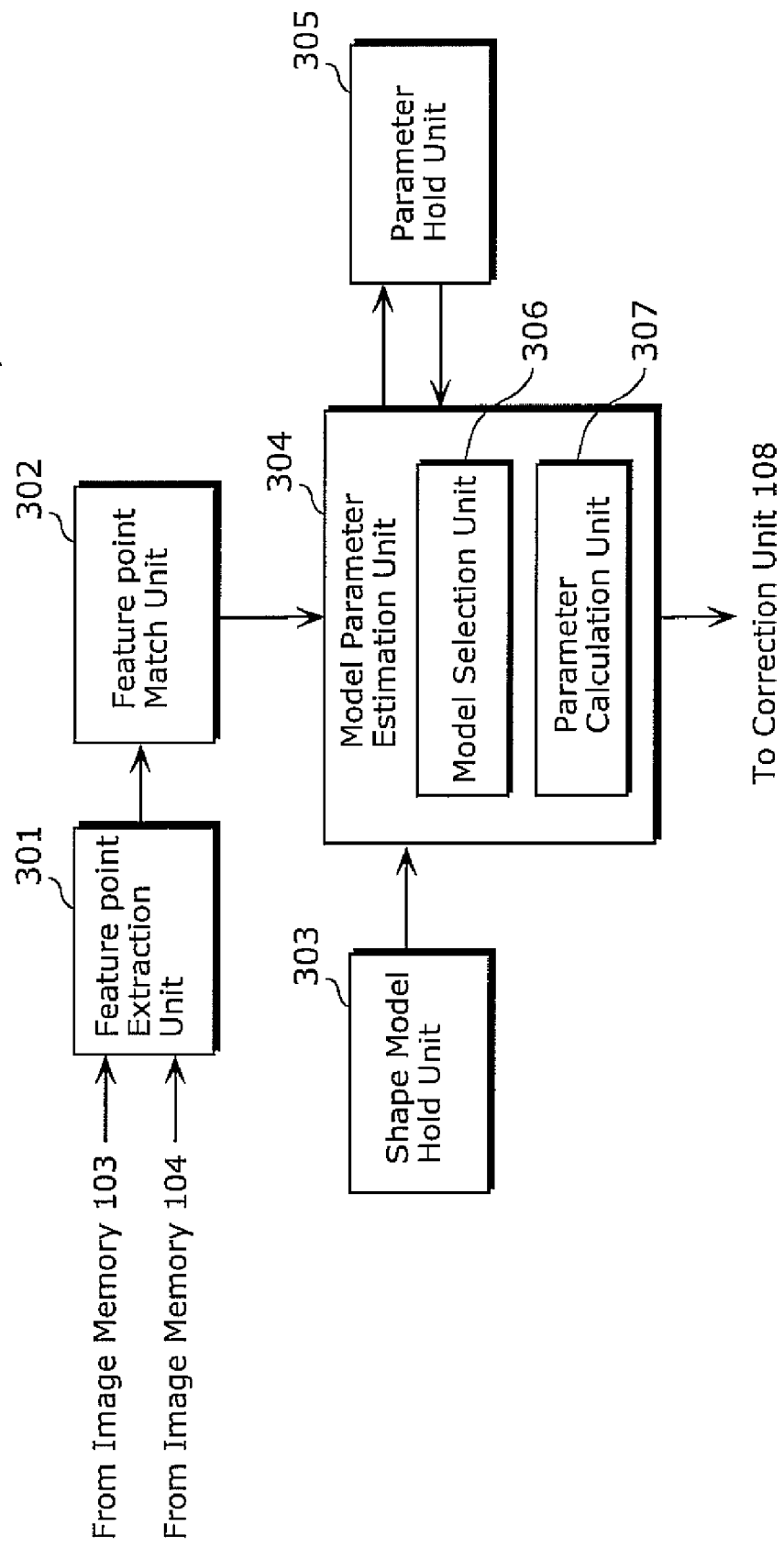

FIG. 4

| Shape Model ||
|---|---|
| Model Name | Mathematical Equation |
| Projection Transformation Model | $(x', y') = f(x, y)$ |
| Cylinder Model | $(x', y') = g(x, y)$ |
| Sphere Model | ⋮ |
| TPS Model | |
| ⋮ | ⋮ |

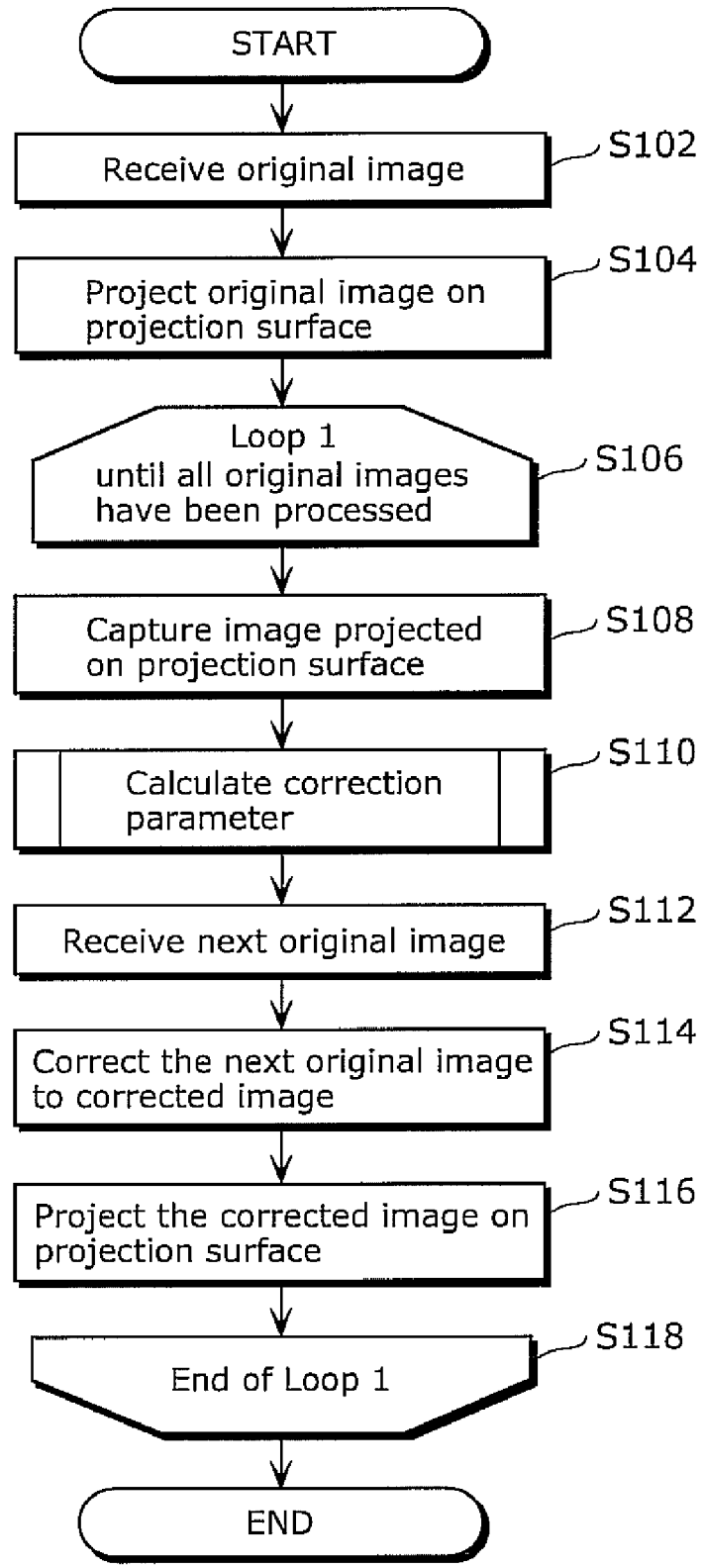

FIG. 11
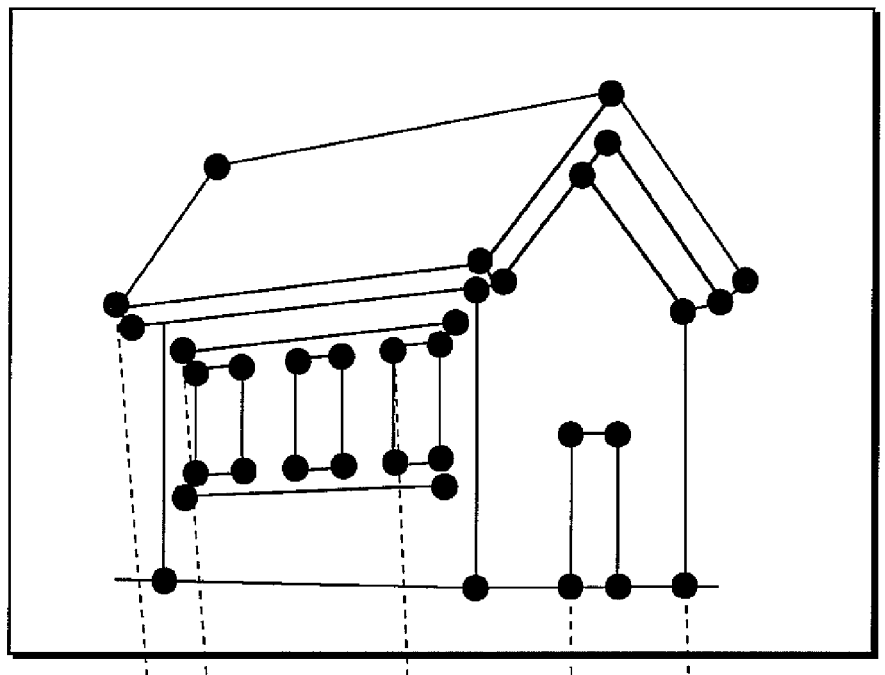
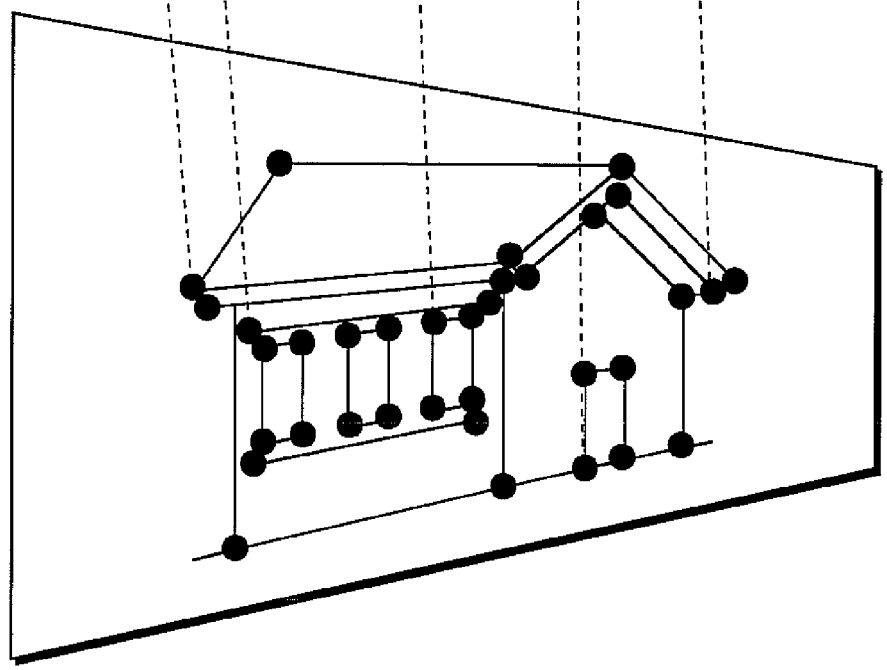
601

PROJECTOR AND PROJECTION METHOD

BACKGROUND OF THE INVENTION (1) Field of the Invention

The present invention relates to projectors having a function of automatically correcting distortion of images to be projected when projecting the images on a projection surface.

(2) Description of the Related Art

In recent years, use of projectors projecting still images and moving images on projection surfaces such as screens has been increased. When a projection surface has a non-planar shape or a planar shape not facing a projector, on the projection surface the projector projects an image having a shape different from a shape of an original of the image provided to the projector (hereinafter, referred to as an "original image").

Therefore, in order to address the problem of distortion (deformation) of an image that is projected by a projector, various solutions as described below have been proposed to previously correct an original image to be projected and project the corrected image so that a user can view the projected image having almost the same shape as that of the original image.

One solution is disclosed in Japanese Unexamined Patent Application Publication No. 10-200836 (hereinafter, referred to as "Patent Reference 1") to project an image having rectangular patterns on a projection surface and capture the projected image by a camera, when setting a projector and the projection surface. Then, an amount of distortion (hereinafter; referred to as a "distortion amount") of the projected image is calculated from an outline of the patterned image captured by the camera, which is deformed to be a trapezium. Before an image to be actually viewed is projected, the image is previously processed to have distortion reversed from the calculated distortion amount so that the image can be projected without any distortion.

Another solution is disclosed in Japanese Unexamined Patent Application Publication No. 2001-83949 (hereinafter, referred to as "Patent Reference 2") to project a test image illustrating dots (patterned image) on a projection surface and capture an image of the projected text image by a camera, when the projector and the projection surface are set. Next, by comparing an original of the test image to the image captured by the camera, a distortion amount of the projected test image is calculated. Then, before projecting an image to be actually viewed, the image is previously corrected to have distortion reversed from the calculated distortion amount so that images can be projected without distortion. In addition, Patent Reference 2 discloses a method of projecting such a test image by wavelength regions except a visual light range.

Still another solution is disclosed in Japanese Unexamined Patent Application Publication No. 2001-320652 (hereinafter, referred to as "Patent Reference 3") to project a patterned image on a projection surface and capture an image of the projected image by a camera, when setting the projector and the projection surface. Then, by comparing the original patterned image to the image of the patterned image captured by the camera, a distortion amount of the projected patterned image is calculated. Then, before projecting an image to be actually viewed, the image is previously corrected to have distortion reversed from the calculated distortion amount so that images can be projected without distortion. It is also disclosed that the patterned image may illustrate a single dot, or a plurality of dots.

Still another solution is disclosed in Japanese Unexamined Patent Application Publication No. 2004-165944 (hereinafter, referred to as "Patent Reference 4") to capture, using a camera, an image of an image projected by a projector on a projection surface, extract a feature point from an original image of the projected image, and extract, from the image captured by the camera, a corresponding point that corresponds to the feature point. Next, three-dimensional coordinates of corresponding points on the projection surface which correspond to the feature points are determined using (i) the feature points and the corresponding points and (ii) parameters of the projector and the camera. Then, the projected image is corrected using the three-dimensional coordinates. Patent Reference 4 also discloses that, in order to perform the correction, a planar surface of the projected image is divided to a plurality of triangular regions each having a vertex that is the feature point, and interpolate three-dimensional coordinates of a pixel in the triangular region from the three-dimensional coordinates of the vertex supposing that the triangular region were planar on three-dimensional space.

Still another solution is disclosed in Japanese Unexamined Patent Application Publication No. 2004-320662 (hereinafter, referred to as "Patent Reference 5") to hold a predetermined approximation formula in a projector in order to correct distortion of images caused by a shape of a projection surface on which the images are projected. Then, when a user inputs a variable for the approximation formula, transformation (distortion correction) is performed depending on the shape of the projection surface. Patent Reference 5 discloses that the approximation formula is a parabola formula for cylindrical or spherical projection surfaces, a linear formula for wall-shaped projection surfaces having corners to correct the corners, and a formula of a trigonometric function for projection surfaces curving with sinusoidal patters.

Still another solution is disclosed in Japanese Unexamined Patent Application Publication No. 2006-94458 (hereinafter, referred to as "Patent Reference 6") that a projector previously holds an approximation formula (function formula) regarding a shape of a projection surface. Then, when a user inputs a variable (variable parameter) for the approximation formula, a mesh model of the projection surface is generated, and distortion correction is performed based on a correspondence relationship between an input image (planar surface) and the mesh model of the projection surface.

Unfortunately, the above-described technologies have the following problems when a shape of the projection surface such as a screen or a positional relationship between the projection surface and the projector is changed in the middle of projecting the images.

The technology of Patent Reference 1 needs the projection of the patterned image and the calculation of the distortion amount, before projecting image(s) the user desires to view (hereinafter, is referred to as "viewing image(s)"). Therefore, if a shape of the projector surface or a positional relationship between the projection surface and the projector is changed in the middle of projection of viewing images, it is necessary to stop the projection and re-calculate a distortion amount by projecting a patterned image. Thus, the technology of Patent Reference 1 is not suitable for use in viewing moving images. Thus, the technology of Patent Reference 1 is not suitable for use in viewing moving images.

The technology of Patent Reference 2 also has the same problem as that of Patent Reference 1 when the patterned image illustrating dots. More specifically, if a shape of the projector surface or a positional relationship between the projection surface and the projector is changed in the middle of projection of viewing images, it is necessary to stop the projection and re-calculate a distortion amount by projecting a patterned image. Thus, the technology of Patent Reference 1 is not suitable for use especially in viewing moving image.

Here, the technology of Patent Reference 2 can solve the problem of Patent Reference 1 by projecting the patterned image in a range of wavelengths of light except visual light. This means that, even if a shape of the projector surface or a positional relationship between the projection surface and the projector is changed in the middle of projection of viewing images, it is possible to calculate a distortion amount without interrupting user's viewing of images. However, since the projector and the camera needs to handle images in the region of wavelengths of light except visual light, a cost related to hardware is increased.

The technology of Patent Reference 3 also has the same problem as that of Patent Reference 1 because a distortion amount is calculated using a patterned image. That is, if a shape of the projector surface or a positional relationship between the projection surface and the projector is changed in the middle of projection of viewing images, it is necessary to stop the projection and re-calculate a distortion amount by projecting a patterned image. Thus, the technology of Patent Reference 3 is not suitable for use in viewing moving images.

The technology of Patent Reference 4 can solve the problem of Patent Reference 1. Even if a shape of the projector surface or a positional relationship between the projection surface and the projector is changed in the middle of projection of viewing images, it is possible to calculate a distortion amount without interrupting user's viewing of images. However, a distance between feature points is approximated on a triangular planar surface in a three-dimensional space. Therefore, when the image illustrates a small number of feature points, a shape of the projection surface is approximated using large triangular planar surfaces, which results in a problem of unsatisfactory distortion correction. Furthermore, since approximation of a shape of the projection surface is decided using only feature points of an image, there is a possibility that the approximation is significantly varied depending on images. Therefore, when the calculation of a distortion amount of the projection surface using feature points in an image is performed (updated) every predetermined time interval (every several dozens of images, every few seconds, for example), projection of moving images consisting of quite different images that are projected continuously as time passes results in a possibility of a significant difference in an approximated shape of the projection surface between before and after the updating. This also results in changes in methods of correcting images, resulting in a possibility of causing discomfort of a user viewing projected images.

The technology of Patent Reference 5 can express a shape of the projection surface by an approximation formula, but details of the shape are expressed by obtaining a variable for the approximation formula which a user inputs. This means that before projecting viewing image(s) the user needs to set a variable, projecting a patterned image or the like and watching the projected image. In addition, in the same manner as disclosed in Patent Reference 1, if a shape of the projector or a positional relationship between the projection surface and the projector is changed in the middle of projection of viewing images, it is necessary to stop the projection and re-calculate a distortion amount by projecting a patterned image. Thus, the technology of Patent Reference 5 is not suitable for use in viewing moving images.

The technology of Patent Reference 6 can express a shape of the projection surface by an approximation formula, but details of the shape are expressed by obtaining a variable for the approximation formula which the user inputs. That is, before projecting viewing image(s) which the user desires to view, it is necessary to measure a shape or the like of the projection surface and then input a variable. In addition, in the same manner as disclosed in Patent Reference 1, if a shape of the projector surface or a positional relationship between the projection surface and the projector is changed in the middle of projection of viewing images, it is necessary to stop the projection and re-calculate a distortion amount by projecting a patterned image. Thus, the technology of Patent Reference 6 is not suitable for use in viewing moving images.

Thus, the present invention overcomes the problems of the conventional technologies as described above. It is an object of the present invention to provide a projector that can appropriately correct shapes of images projected on a projection surface without interrupting user's viewing of the projected image(s), even if a shape of the projector surface or a positional relationship between the projection surface and the projector is changed in the middle of the projection of the viewing images.

SUMMARY OF THE INVENTION

In accordance with an aspect of the present invention for achieving the object, there is provided a projector that projects inputted original images on a projection surface, the projector including; an image capturing unit configured to capture an image of a projection target image projected by the projector on the projection surface, the projection target image being an original image to be projected or a corrected image generated by correcting an original image; a shape model hold unit configured to hold shape models each expressing a corresponding predetermined type of a shape; a model selection unit configured to select, as a projection surface shape model, a shape model expressing a type of a shape of the projection surface from among the shape models held in the shape model hold unit based on correspondence relationships between first feature points on the projection target image and second feature points on the image captured by the image capturing unit; a parameter calculation unit configured to calculate a model parameter using the projection surface shape model based on correspondence relationships between the first feature points on the projection target image and the second feature points on the image captured by the image capturing unit in order to approximate the image captured by the image capturing unit to the original image, the model parameter being used to approximate a shape of the projection surface shape model to the shape of the projection surface and indicating a positional relationship between the projection surface and the projector, and the calculation being performed for each of projection target images including the projection target image; a correction unit configured to, when the model parameter is calculated, correct another original image to be projected using the projection surface shape model and the model parameter; and a projection unit configured to project, as another projection target image, the corrected image corrected by the correction unit on the projection surface.

With the above structure, the parameter calculation unit calculates the model parameter for each projection target image (in other words, for a projection target image of each currently-projecting image). Thereby, a shape of a shape model for the projection surface is approximated to a shape corresponding to (i) a shape of the projection surface and (ii) a positional relationship between the projection surface and the projector, without interrupting user's viewing images during projection of the images. In addition, since a next original image to be projected is corrected based on the shape model selected for the projection surface and then projected on the projection surface, image approximation based on the shape of the projection surface is not significantly different among images and shapes of images can be corrected appropriately without causing discomfort in viewing, even if moving images consisting of quite different images are continuously projected as time passes thereby changing image correction methods frequently. As a result, even if the shape of the projection surface or a positional relationship between the projection surface and the projector is changed in the middle of projecting images, or even if moving images consisting of quite different images are continuously projected as time passes thereby changing image correction methods frequently, the projector can appropriately correct shapes of images to be projected without interrupting user's viewing of projected images and without causing discomfort in the viewing.

It is preferable that the model selection unit configured to select a single projection surface shape model from among the shape models held in the shape model hold unit for the projection target images, and that the parameter calculation unit is configured to calculate the model parameter using the single projection surface shape model for each of the projection target images, so that the calculation for the projection target images being performed depending on (i) the shape of the projection surface and (ii) a change in the positional relationship between the projection surface and the projector.

With the above structure, the parameter calculation unit can calculate an optimum model parameter using the shape model selected for the projection surface.

It is also preferable that the parameter calculation unit is configured to repeatedly calculate the model parameter until the image captured by the image capturing unit is approximated to an image enlarged or reduced from the original image.

With the above structure, the parameter calculation unit calculates the model parameter so that the image captured by the image capturing unit is transformed to an image enlarged or reduced from the original image of the currently-projecting image. As a result, the user can view images without distortion projected on the projection surface.

It is further preferable that the model selection unit configured to select a single projection surface shape model from among the shape models held in the shape model hold unit for the projection target images, and that the parameter calculation unit is configured to calculate the model parameter using the single projection surface shape model for each of the projection target images, so that the calculation for the projection target images being performed depending on (i) the shape of the projection surface and (ii) a change in the positional relationship between the projection surface and the projector.

With the above structure, when the shape of the projection surface is hardly changed in the middle of projecting images, model parameters are calculated for images using the single shape model for the projection surface. As a result, the projector can calculate an optimum model parameter for each projection target image (in other words, for each currently-projecting image) depending on (i) is the shape of the projection surface and (ii) a change in a positional relationship between the projection surface and the projector.

It is still further preferable that the parameter calculation unit is configured to calculate the model parameter using a shape model assuming that the shape model is the projection surface shape model to be selected from among the shape models held in the shape model hold unit, and that the model selection unit is configured to select the shape model as the projection surface shape model, so that (i) the number of certain points among the second feature points which are modified using the model parameter corresponding to the selected shape model exceeds a second threshold value and that (ii) a difference between (ii-1) coordinates of each of the certain points and (ii-2) coordinates of a point which is on the original image and corresponds to the each of the certain points is equal to or less than a first threshold value.

With the above structure, the number of certain second feature points each of which has a difference equal or less than the threshold value between (i) coordinates of the certain second feature point and (ii) coordinates of a point that is on the original image of the currently-projecting image (the projection target image) and corresponds to the certain second feature point is calculated. Based on the number of such certain second feature points, it is possible to select a shape model suitable for a shape type of the projection surface.

It is still further preferable that the parameter calculation unit is configured to calculate a plurality of the model parameters using a plurality of shape models assuming that one shape model of the plurality of shape models is the projection surface shape model to be selected from among the shape models held in the shape model hold unit, and that the model selection unit is configured to select the one shape model from among the plurality of shape models as the projection surface shape model, so that coordinates of the second is feature points modified using the model parameter corresponding to the one shape model are most approximated to coordinates of points which are on the original image and correspond to the second feature points.

With the above structure, it is possible to select a shape model most suitable for a shape type of the projection surface.

It is still further preferable that the model selection unit is configured to select the projection surface shape model according to a signal provided from outside of the projector.

With the above structure, when, for example, the shape of the projection surface is already known, the user can designate a shape model to be selected for the projection surface.

It should be noted that the present invention can be implemented not only as the projector including the above characteristic units, but also as an integration circuit including the above characteristic units and controlling the projector. It should also be noted that the present invention can be implemented also as: a projection method including steps performed by the characteristic units of the projector: a computer program recorded on a computer-readable recording medium to cause a computer to execute the characteristic steps of the projection method; and the like. Of course, the computer program can be distributed by a recording medium such as a Compact Disc-Read Only Memory (CD-ROM) or by a transmission medium such as the Internet.

Accordingly, the projector according to the present invention can appropriately correct shapes of images projected on a projection surface without interrupting user's viewing of the projected images and without causing discomfort in the viewing, even if a shape of the projector surface or a position relationship between the projection surface and the projector is changed in the middle of the projection of the viewing images, or even if moving images consisting of quite different images are continuously projected as time passes thereby changing image correction methods frequently.

FURTHER INFORMATION ABOUT TECHNICAL BACKGROUND TO THIS APPLICATION

The disclosures of Japanese Patent Applications Nos. 2007-288348 and 2008-282242 filed on Nov. 6, 2007 and Oct. 31, 2008, respectively, including specifications, drawings and claims are incorporated herein by reference in its entirety.

BRIEF DESCRIPTION OF THE DRAWINGS

These and other objects, advantages and features of the invention will become apparent from the following description thereof taken in conjunction with the accompanying drawings that illustrate a specific embodiment of the present invention. In the Drawings:

FIG. 3 is a block diagram showing a structure of a correction parameter calculation unit according to the first embodiment of the present invention;

FIG. 4 is a table showing an example of shape models held in a shape model hold unit according to the first embodiment of the present invention;

FIG. 5 is a flowchart of processing performed by the projector according to the first embodiment of the present invention;

FIG. 11 is a diagram showing an example of correspondence relationships between the first feature points and the second feature points according to the first embodiment of the present invention;

DESCRIPTION OF THE PREFERRED EMBODIMENT(S)

The following describes a preferred embodiment of the present invention with reference to FIGS. 1 to 13C.

First Embodiment

Figure 1:
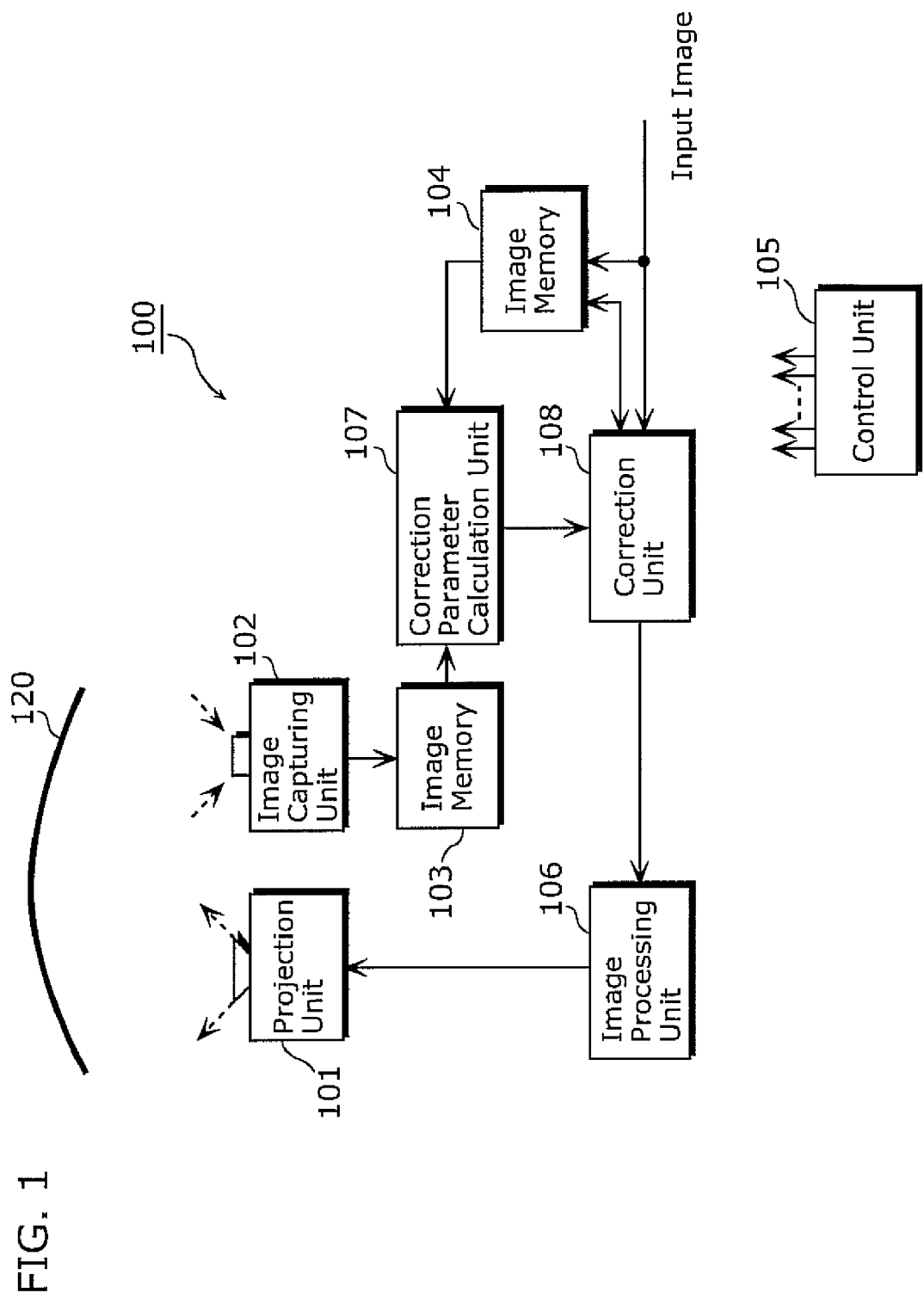
FIG. 1 is a block diagram showing a structure of a projector according to a first embodiment of the present invention.

FIG. 1 is a block diagram showing a structure of a projector according to a first embodiment of the present invention.

A projector 100 according to the first embodiment is a device that receives input image(s) including still image(s) or moving images from the outside, corrects each of the input images according to a shape of a projection surface 120, and projects the corrected input image on the projection surface 120. As shown in FIG. 1, the projector 100 includes a projection unit 101, an image capturing unit 102, image memories 103 and 104, a control unit 105, an image processing unit 106, a correction parameter calculation unit 107, and a correction unit 108.

The projection unit 101 has a projecting device using a liquid crystal display or a micro-mirror display to project an image provided from the image processing unit 106 onto the projection surface 120.

The image capturing unit 102 captures an image of the image projected by the projection surface 120. More specifically, the image capturing unit 102 is a camera having Metal-Oxide-Semiconductor (MOS) or Charge-Coupled Device is (CCD) solid-state imaging device to capture an image of the image on the projection surface 120. An region within which the image capturing unit 102 can capture an image (hereinafter, referred to as a "capture region") is set so that a region of the projection surface on which the projection unit 101 projects an image (hereinafter, referred to as a "projection region") can be surely included in the capture region when the projector 100 is generally used.

The image memory 103 is a memory in which the image captured by the image capturing unit 102 is stored. Hereinafter, the image captured by the image capturing unit 102 is referred to as a "captured image".

The image memory 104 is a memory in which an input image provided from the outside of the projector 100 (hereinafter, referred to as an "original image") or an image corrected by the correction unit 108 (hereinafter, referred to as a "corrected image") is stored.

Hereinafter, an original image means an input image that has not yet been corrected, in other words, has not yet been provided to the correction unit 108. Examples of the original image includes an image provided from a computer, a still image or one of moving images obtained by receiving broadcast waves, a still image and one of moving images generated by reproducing a content recorded on a recording medium such as a Digital Versatile Disc (DVD), a Hard Disk Drive (HDD), or a semiconductor memory, and the like. Hereinafter, a corrected image means an image that has been corrected to suppress distortion (distortion in a shape) of an image caused by a relative positional relationship between the projector 100 and the projection surface 120 and a shape of the projection surface 120. Hereinafter, a "projection target image" means (i) an original image that is to be projected but has not yet been projected if the original image is a start original image in original images, or (ii) a corrected image that is to be projected but has not yet been projected if the corrected image is generated by correcting an original image which is not the start original image.

The correction parameter calculation unit 107 receives images from the image memory 103 and from the image memory 104 and calculates a correction parameter to correct shape distortion, for each image that is currently being projected (hereinafter, referred to also as a "currently-projecting image"), in other words, for a projection target image of each currently-projecting image. The correction parameter calculation unit 107 is described later in more detail.

Every time a correction parameter is calculated for each currently-projecting image, the correction unit 108 corrects a next original image to be projected using the correction parameter. Then, the correction unit 108 provides the corrected image to the image processing unit 106. Since a correction parameter is generated using a currently-projecting image, correction of a next original image is performed approximately one image later, in other words, after projecting a projection target image prior to the next projection target image.

The image processing unit 106 converts a format of the image provided from the correction unit 108 to a format compatible with the projection unit 101, and provides signals of the converted image to the projection unit 101. Examples of the conversion include resolution conversion of images, YUV-RGB signal conversion, and the like.

The control unit 105 controls the overall projector 100. In more detail, the control unit controls timings of providing images from the image memories 103 and 104 to the correction parameter calculation unit 107, the processing of the correction parameter calculation unit 107, and the like.

Figure 2A:
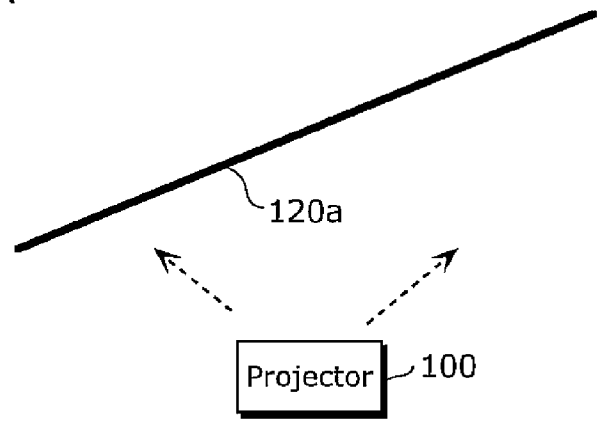
FIG. 2A is a diagram showing an example of a projection surface on which a projection unit projects images according to the first embodiment of the present invention.
Figure 2B:
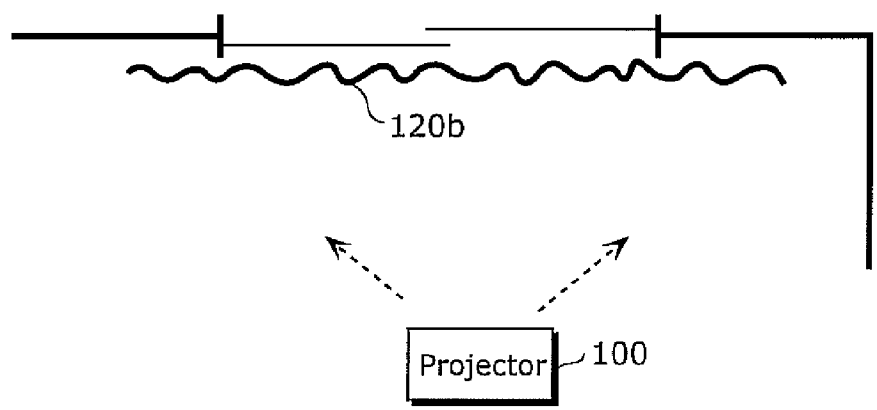
FIG. 2B is a diagram showing another example of the projection surface on which the projection unit projects images according to the first embodiment of the present invention.
Figure 2C:
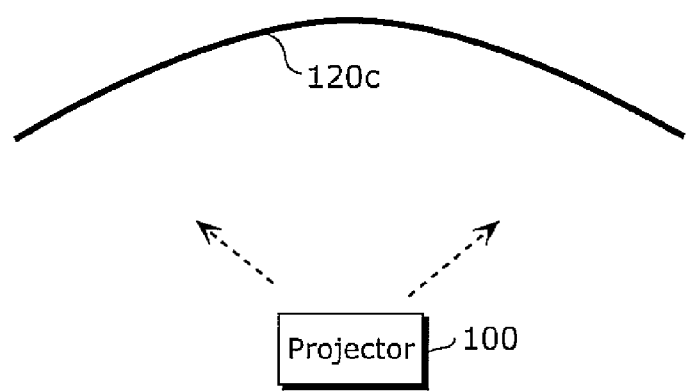
FIG. 2C is a diagram showing still another example of the projection surface on which the projection unit projects images according to the first embodiment of the present invention.

Each of FIGS. 2A to 2C is a diagram showing an example of a projection surface 120 on which the projection unit 101 projects images.

FIG. 2A shows a situation where the projector 100 projects an image on planar projection surface 120a having a planar surface, projecting in a direction not facing the projection surface 120a (in other words, in an oblique direction). In this situation, the image projected on a projected region of the projection surface 120a has distortion in a shape (hereinafter, referred to as "shape distortion") and the shape of the image is deformed to be a trapezium. However, this shape distortion can be corrected by the correction unit 108 for an image to be projected subsequently.

FIG. 2B shows a situation where the projector 100 projects an image on a projection surface 120b that is a curtain in a room. In this situation, the image projected on a projected region of the projection surface 120b also has shape distortion due to a shape of the curtain. However, this shape distortion can be corrected by the correction unit 108 for an image to be projected subsequently.

FIG. 2C shows a situation where the projector 100 projects an image on a projection surface 120b having a curved surface. In this situation, the image projected on a projected region of the projection surface 120c also has shape distortion (curve, for example). However, this shape distortion can be corrected by the correction unit 108 for an image to be projected subsequently.

Next, the correction parameter calculation unit 107 is described in more detail.

FIG. 3 is a block diagram showing a structure of the correction parameter calculation unit 7.

As shown in FIG. 3, the correction parameter calculation unit 107 includes a feature point extraction unit 301, a feature point match unit 302, a shape model hold unit 303, a model parameter estimation unit 304, and a parameter hold unit 305.

The feature point extraction unit 301 receives a captured image of a currently-projecting image from the image memory 103 and an original image (if the currently-projecting image is regarding is a start original image) or a corrected image (if the currently-projecting image is not regarding the start original image) of the currently-projecting image from the image memory 104.

The feature point extraction unit 301 extracts feature points from the original image or the corrected image provided from the image memory 104, and also extracts feature points from the captured image provided from the image memory 103. More specifically, until an original image following a start original image among inputted original images is corrected, in other words, when the feature-point extraction is performed using images regarding the start original image, the feature point extraction unit 301 extracts first feature points from the start original image and extracts second feature points from a captured image of the start original image. On the other hand, after an original image following the start original image is corrected, in other words, when the feature-point extraction is performed using images regarding an original image that is not the start original image, the feature point extraction unit 301 extracts first feature points from a corrected image of the original image and extracts second feature points from a captured image of the corrected image. In other words, the feature point extraction unit 301 extracts first feature points from a projection target image and second feature points from a capture image of the projection target image.

The feature point match unit 302 performs feature-point matching between the images, using the first and second feature points extracted from the feature point extraction unit 301. In other words, the feature point match unit 302 determines correspondence relationships between the first feature points and the second feature points.

The shape model hold unit 303 holds shape models each expressing a corresponding predetermined type of a shape. More specifically, as the shape models, the shape model hold unit 303 is holds approximation formulas or function formulas to express various shape types of the projection surface 120. It should be noted that the shape model hold unit 303 may hold only one shape model or a plurality of shape models.

FIG. 4 is a table showing an example of the shape models held in the shape model hold unit 303.

As shown in FIG. 4, the shape model hold unit 303 holds shape models each expressed by a mathematical equation. For example, a shape model having a "model name" that is a projection transformation model is defined by a "mathematical equation" of $(x', y') = f(x, y)$. Here, $(x, y)$ represents coordinates of the second feature point, and $(x', y')$ represents coordinates of the second feature point modified using the shape model.

For instance, when the projection surface 120 is expected to be a planar surface, the projection transformation model is used. Furthermore, when the projection surface 120 is expected to have a shape of a cylinder or a sphere, a cylinder model defined by a function formula expressing a cylinder or a sphere model defined by a function formula expressing a sphere is used. Furthermore, when the projection surface 120 is expected to have a complicated shape, a Thin Plate Spline (TPS) model or the like is used to model the complicated shape.

The TPS method is used to deform an image, supposing that a planar surface of the image were a thin plate and straining the thin plate. Here, the thin plate is strained so that the first feature point matches the corresponding second feature point. This transformation is performed by combining affine deformation and local non-linear transformation. The local non-linear transformation is performed by superposition of radical basis functions.

Referring back to FIG. 3, the model parameter estimation unit 304 includes a model selection unit 306 and a parameter calculation unit 307.

The model selection unit 306 selects a shape model expressing a type of a shape of the projection surface 120 from among the shape models held in the shape model hold unit 303 based on the correspondence relationships between the first feature points and the second feature points determined by the feature point match unit 302.

The parameter calculation unit 307 calculates a model parameter based on the correspondence relationships in order to approximate the captured image to be the original image of the currently-projecting image. The calculation is performed for each currently-projecting image (in other words, for a projection target image of each currently-projecting image).

The model parameter is used to approximate a shape of the shape model selected by the model selection unit 306 to be the shape of the projection surface 120, and indicates a positional relationship between the projection surface 120 and the projector 100. More specifically, each of functions "f" and "g" in the mathematical equations shown in FIG. 4 is a model parameter. A set of the selected shape model and the calculated model parameter is called a correction parameter.

The parameter hold unit 305 holds the correction parameter generated as above. In more detail, the parameter hold unit 305 holds the shape model selected by the model selection unit 306 and the model parameter calculated by the parameter calculation unit 307.

The following describes processing performed by the projector 100.

FIG. 5 is a flowchart of the processing performed by the projector 100 according to the first embodiment of the present invention.

Firstly, the projector 100 receives a start original image is (S102).

Figure 6A:
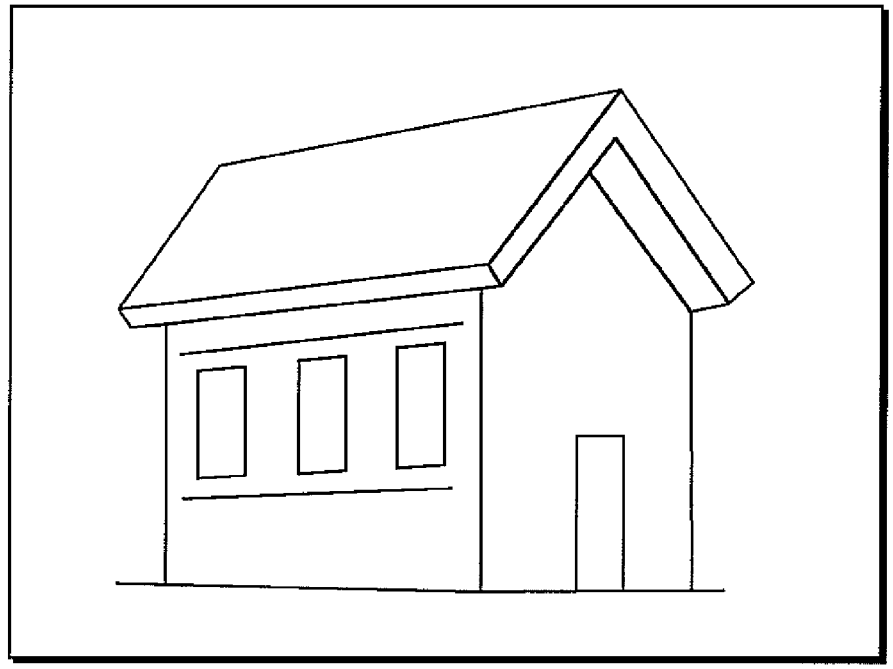
FIG. 6A is a diagram showing an example of an original image provided to the projector according to the first embodiment of the present invention.

An example of an original image provided to the projector 100 is shown in FIG. 6A. In this example, the original image as shown in FIG. 6A is assumed to be provided to the projector 100.

Then, the received start original image is held in the image memory 104. The correction unit 108 also receives the start original image, and provides the start original image to the image processing unit 106. The image processing unit 106 converts a format of the start original image to a format compatible with the projection unit 101.

Referring back to FIG. 5, the projection unit 101 receives the start original image from the image processing unit 106 and projects the start original image on the projection surface 120 (S104).

Figure 6B:
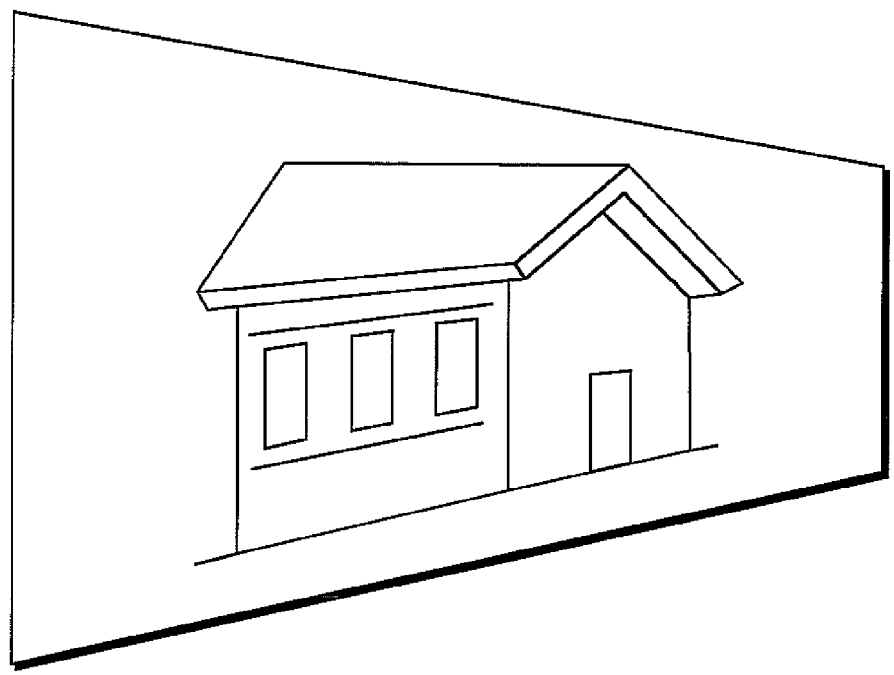
FIG. 6B is a diagram showing an example of an image projected on the projection surface according to the first embodiment of the present invention.

An example of an image projected on the projection surface 120 is shown in FIG. 6B. In this example, it is assumed that the projection surface 120 is the projection surface 120a as shown in FIG. 2A and that the projected image is seen as shown in FIG. 6B.

Referring back to FIG. 5, after Step S104, the following processing is repeated until all original images provided to the projector 100 have been projected (S106 to S118).

Firstly, the image capturing unit 102 captures an image of the start original image that is being projected on the projection surface 120 (S108). The captured image is held in the image memory 103. The captured image is the image of FIG. 6B.

Next, the correction parameter calculation unit 107 receives images from the image memory 103 and the image memory 104, and calculates a correction parameter by comparing these images. The processing performed by the correction parameter calculation unit 107 is described later in more detail.

Then, the projector 100 receives a next original image (S112).

The correction unit 108 corrects the next original image using is the correction parameter calculated at Step S110 (S114). Then, the correction unit 108 provides the corrected image to the image processing unit 106. The image processing unit 106 converts a format of the corrected image to a format compatible with the projection unit 101. Note that the corrected image generated by the correction unit 108 is held in the image memory 104.

Then, the projection unit 101 projects the corrected image provided from the image processing unit 106 on the projection surface 120 (S116).

Figure 7:
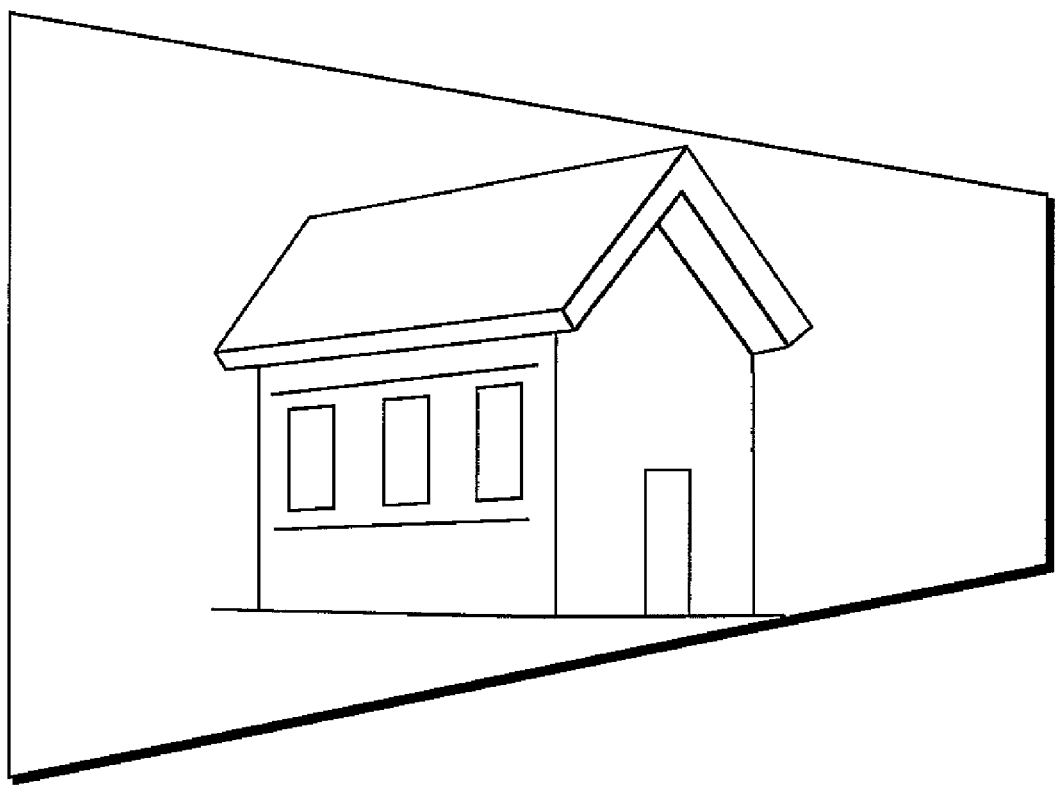
FIG. 7 is a diagram showing an example of an image corrected and projected on the projection surface according to the first embodiment of the present invention.

An example of a corrected image projected on the projection surface 120 is shown in FIG. 7. In this example, the projection unit 101 is assumed to project the image as shown in FIG. 7 on the projection surface 120. That is, once a correction parameter is calculated, a correction image generated by correcting an original image is projected on the projection surface 120.

After Step S116, the processing returns to S106 and the image capturing unit 102 captures an image of the corrected image that is being projected on the projection surface 120 (S118, S106, and S108). Referring back to S110, the correction parameter calculation unit 107 calculates a correction parameter depending on how an original image of a captured image has been corrected (S110).

More specifically, the correction parameter calculation unit 107 calculates a correction parameter using (i) a corrected image generated by the correction unit 108 and provided from the image memory 104 regarding a currently-projecting image and (ii) a captured image of the currently-projecting image. Here, a correction parameter is a parameter generated based on a corrected image. In other words, the correction parameter calculation unit 107 calculates a correction parameter by comparing (i) a corrected image that has not yet been projected on the projection surface 120 and (ii) a captured image that has already been projected on the projection surface 120. Therefore, the correction parameter expresses (i) a shape of the projection surface 120 and (ii) characteristics in a positional relationship between the projection surface 120 and the projector 100.

As described above, the processing for projecting an image (S108 to S116) is repeated, and the whole processing of the projector 100 is completed when all original images are provided to the projector 100 and have been projected (S106 to S118).

The following describes examples of the processing performed by the projector 100 when a projection surface shape model is a projection transformation model.

Figure 8A:
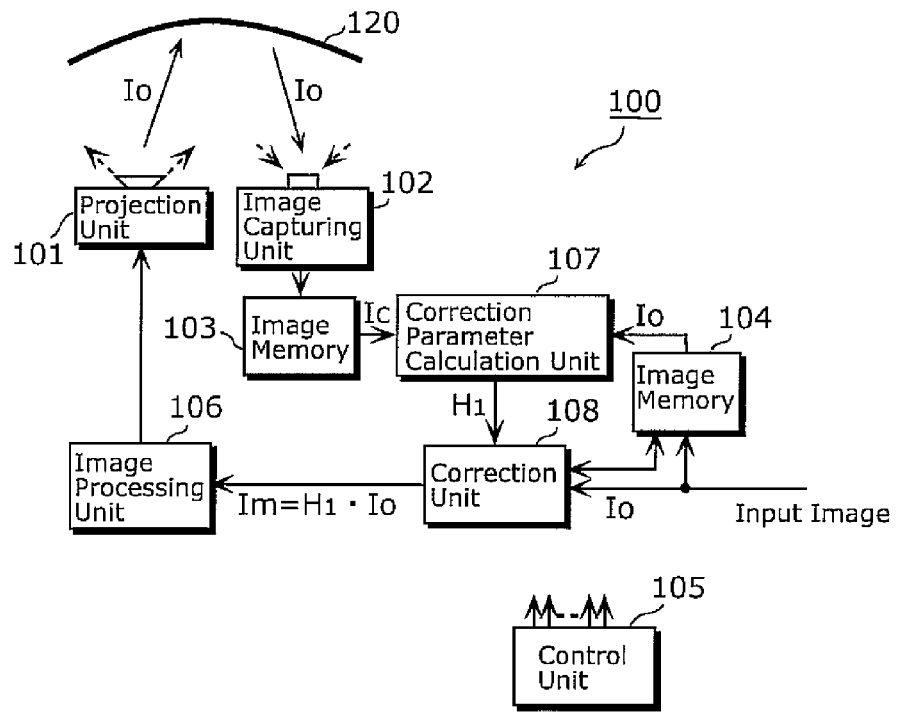
FIG. 8A is a diagram showing an example of processing performed by the projector when a shape model for the projection surface is a projection transformation model according to the first embodiment of the present invention.
Figure 8B:
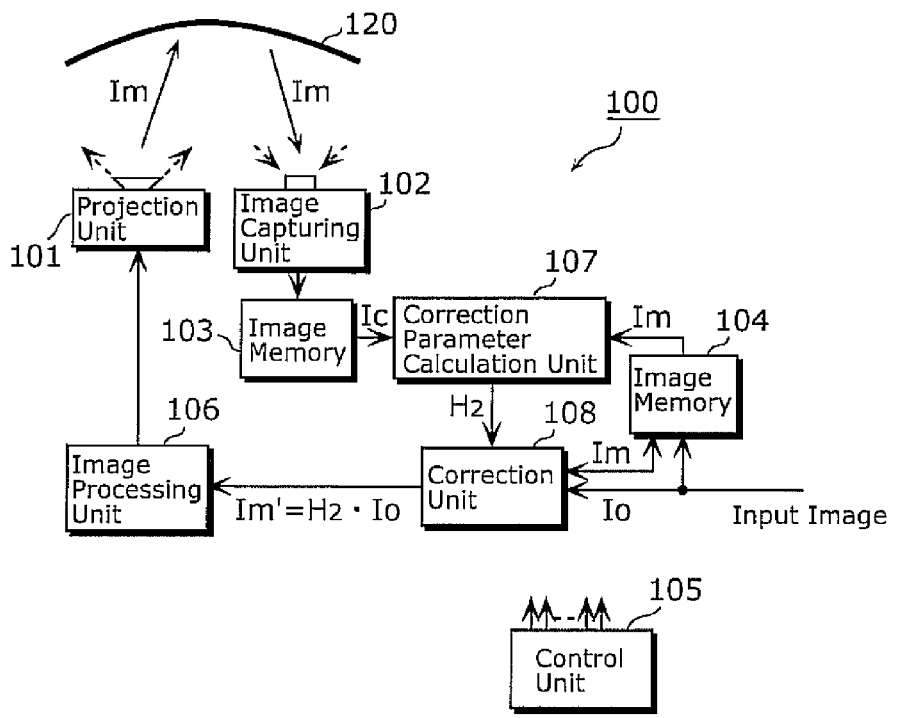
FIG. 8B is a diagram showing a following stage of the example of processing performed by the projector when the shape model of the projection surface is the projection transformation model according to the first embodiment of the present invention.

Both of FIGS. 8A and 8B are diagrams showing an example of processing performed by the projector 100 when a projection surface shape model is a projection transformation model.

As shown in FIG. 8A, firstly a start original image Io is provided to the projector 100 (S102 of FIG. 5), and the projection unit 101 projects the start original image Io on the projection surface 120 (S104 of FIG. 5).

Then, the image capturing unit 102 captures an image of the start original image Io projected on the projection surface 120 (S108 of FIG. 5). The image captured by the image capturing unit 102 is hereinafter referred to as a start captured image Ic.

Next, the correction parameter calculation unit 107 calculates a projection transformation matrix $H_1$ that is a correction parameter of a projection transformation model, by comparing the start original image Io and the start captured image Ic (S110 of FIG. 5).

Then, a next original image Io is provided to the projector 100 (S112 of FIG. 5).

The correction unit 108 corrects the next original image Io to be a corrected image Im, using the correction parameter, namely the projection transformation matrix $H_1$ (S114 of FIG. 5). More specifically, the corrected image Im is generated according to an equation of $Im=H_1 \cdot Io$, where Io represents the next original image.

Next, as shown in FIG. 8B, the projection unit 101 projects the corrected image Im on the projection surface 120 (S116 of FIG. 5), and the image capturing unit 102 captures an image of the corrected image Im projected on the projection surface 120 (S118, S106, and S108 of FIG. 5). This captured image is referred to as a next captured image Ic.

Then, the correction parameter calculation unit 107 calculates a projection transformation matrix $H_2$ using the corrected image Im and the next captured image Ic.

Then, a further original image Io is provided to the projector 100 (S112 of FIG. 5).

The correction unit 108 corrects the further original image Io to be a further corrected image Im', using the correction parameter, namely the projection transformation matrix $H_2$ (S114 of FIG. 5). More specifically, the further corrected image Im' is generated according to the following equation, $$Im'=H_2 \cdot Im=H_2 \cdot (H_1 \cdot Io)=(H_2 \cdot H_1) \cdot Io=H_2' \cdot Io$$

As described above, the processing for projecting an image (S108 to S116 of FIG. 5) is repeated, and the whole processing of the projector 100 is completed when all original images are provided to the projector 100 and have been projected (S106 to S118 of FIG. 5).

Next, the processing performed by the correction parameter calculation unit 107 is described in more detail.

Figure 9:
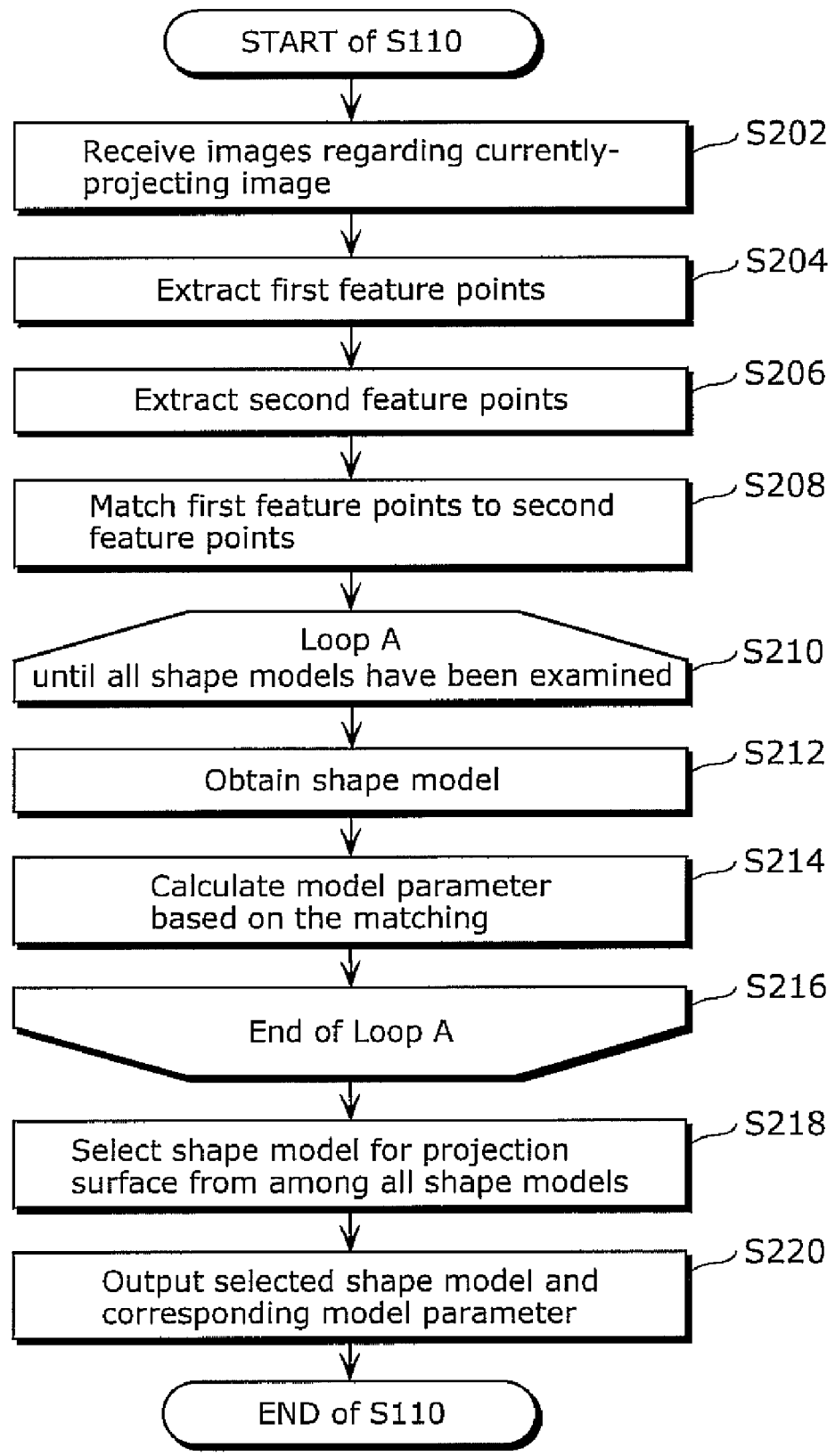
FIG. 9 is a flowchart of an example of processing performed by a correction parameter calculation unit to calculate a correction parameter according to the first embodiment of the present invention.

FIG. 9 is a flowchart of an example of the processing (S110 of FIG. 5) performed by the correction parameter calculation unit 107 to calculate a correction parameter.

Firstly, the feature point extraction unit 301 receives (i) a captured image from the image memory 103 and (ii) a projection target image from the image memory 104 (S202).

Here, the captured image provided from the image memory 103 is an image generated when a projection target image corrected by the correction unit 108 is processed by the image processing unit 106, then projected by the projection unit 101 on the projection surface 120, and captured by the image capturing unit 102. Therefore, the timings of outputting the images from the image memories 103 and 104 to the feature point extraction unit 301 need to be in synchronization with each other, in consideration of a delay time caused by the processing performed on an image by the correction unit 108, the image processing unit 106, the projection unit 101, and the image capturing unit 102.

It should be noted that the timings of outputting from the image memories 103 and 104 do not need to be completely in synchronization with each other, as far as the outputted captured image and the outputted projection target image from both of which feature points are extracted are related to the same input image. For example, it is also possible that projection target images are assigned with different picture numbers and feature points are extracted from a captured image and a projection target image which have the same picture number. Here, the control unit 105 controls timings of outputting images from the image memories 103 and 104.

The feature point extraction unit 301 extracts feature points from the captured image provided from the image memory 103 and from the projection target image provided from the image memory 104.

In more detail, firstly, the feature point extraction unit 301 extracts first feature points from the projection target image (S204). That is, as the first feature points, the feature point extraction unit 301 extracts points from the projection target image provided from the image memory 104. Here, when the image capturing unit 102 has captured an image of a projection target image regarding a start original image at S108 of FIG. 5 (in other words, the image capturing unit 102 has captured an image of the start original image at S108 of FIG. 5), the first feature points are points on the original image (the start original image) held in the image memory 104. On the other hand, when the image capturing unit 102 has captured an image of a projection target image regarding an original image that is not the start original image at S208 of FIG. 5 (in other words, the image capturing unit 102 has captured an image of a corrected image of the original image at S108 of FIG. 5), the first feature points are points on the corrected image held in the image memory 104.

In addition, the feature point extraction unit 301 extracts second feature points from the captured image (S206). That is, as the second feature points, the feature point extraction unit 301 extracts points from the captured image provided from the image memory 103.

Figure 10A:
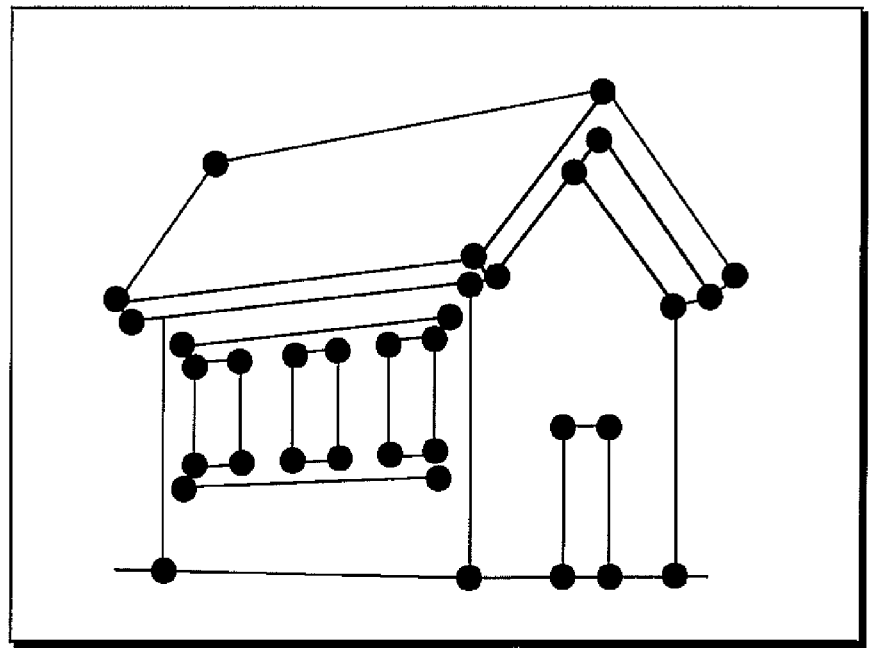
FIG. 10A is a diagram showing an example of first feature points according to the first embodiment of the present invention.
Figure 10B:
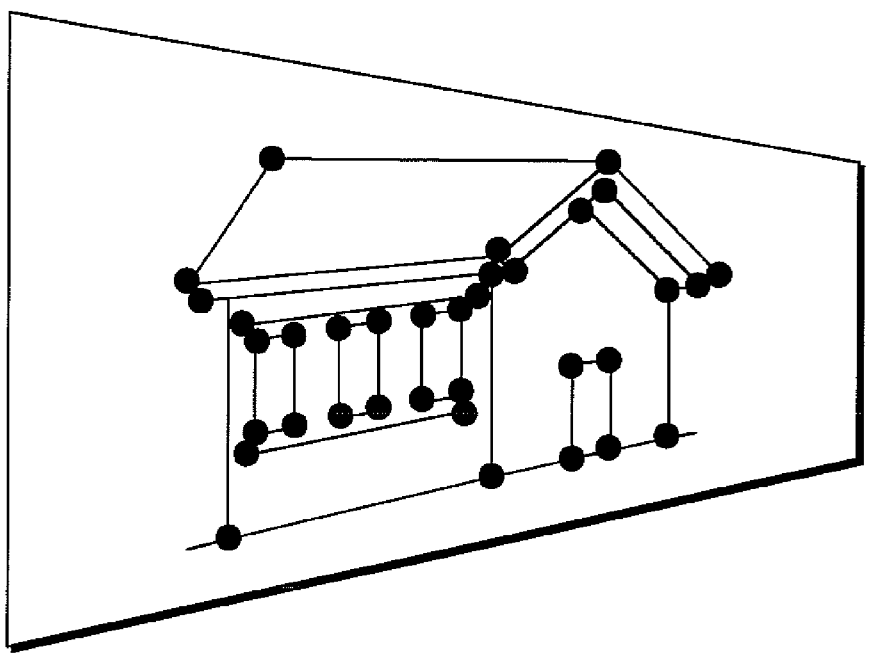
FIG. 10B is a diagram showing an example of second feature points according to the first embodiment of the present invention.

FIG. 10A is a diagram showing an example of the first feature points, and FIG. 10B is a diagram showing an example of the second feature points.

More specifically, FIG. 10A shows first feature points that are feature points on the original image of FIG. 6A. FIG. 10B shows second feature points that are feature points on the captured image of FIG. 6B.

Here, the feature points on these images can be extracted using Harris operator, Scale Invariant Feature Transform (SIFT) operator, or the like. Such an operator is used to extract intersections or the like of edges in the images and calculate feature-point parameters each of which is a parameter of a corresponding feature point (namely, a value representing a position or a strength of the feature point). The feature-point parameters are provided to the feature point match unit 302.

The feature point match unit 302 matches the feature points between the captured image and the projection target image, using is the feature-point parameters of the first feature points and the second feature points extracted by the feature point extraction unit 301 (S208).

For instance, when a feature point is extracted using a SIFT parameter, a feature-point parameter is a vector representing pixel gradient regarding the feature point. For each of the first feature points, a second feature point that is the most similar to (in other words, the most approximated to) the first feature point is extracted. The similarity between a first feature point and a second feature point can be determined according to a degree of similarity between a feature-point parameter of the first feature point and a feature-point parameter of the second feature point. The above-described processing can obtain a correspondence relationship between a first feature point and a second feature point.

FIG. 11 is a diagram showing an example of a plurality of such correspondence relationships between the first feature points and the second feature points.

FIG. 11 shows correspondence relationships between the first feature points of FIG. 10A and the second feature points of FIG. 10B. Here, since showing of all correspondence relationships regarding all feature points makes the figure complicated, only correspondence relationships regarding a part of the feature points are shown for convenience. The correspondence relationships are provided to the model parameter estimation unit 304.

Referring back to FIG. 9, after Step S208, the following processing is repeated until all shape models have been examined (S210 to S216).

Firstly, the model selection unit 306 in the model parameter estimation unit 304 obtains a shape model from the shape model hold unit 303 (S212).

Next, the parameter calculation unit 307 in the model parameter estimation unit 304 calculates a model parameter of the obtained shape model using the correspondence relationships provided from the feature point match unit 302 (S214). More specifically, the parameter calculation unit 307 determines the model parameter while transforming the captured image to be similar to (in other words, to be approximated to) the original image (or the original image of the corrected image) based on the shape model obtained by the model selection unit 306. In other words, the parameter calculation unit 307 repeats the calculation to find the most suitable model parameter so that the captured image can be approximated to an image enlarged or reduced from the original image (or the original image of the corrected image). That is, the parameter calculation unit 307 calculates a model parameter by modifying coordinates of the second feature points so that the modified coordinates of the second feature points are approximated to coordinates of points which are on the original image of the currently-projecting image and correspond to the second feature points.

For example, when the obtained shape model is a projection transformation model, a model parameter of a projection transformation matrix consisting of eight parameters is calculated by a least-squares method or the like.

In more detail, when the obtained shape model is a projection transformation model, the mathematical equation of the projection transformation model shown in FIG. 4 is expressed as $(x', y', 1)^T = aH(x, y, 1)^T$ where "H" represents the projection transformation matrix and "a" represents a predetermined constant. The projection transformation matrix H has eight parameters as shown in the following Equation 1. It should be noted that "a" may be not predetermined and may be determined during the calculation depending on the shape of the projection surface 120.

$$H = \begin{pmatrix} h1 & h2 & h3 \\ h4 & h5 & h6 \\ h7 & h8 & 1 \end{pmatrix} \quad \text{(Equation 1)}$$

Calculation for the eight parameters h1 to h8 is repeatedly performed using a least-squares method or the like until coordinates (x', y') modified from coordinates of a target second feature point (x, y) is eventually approximated to coordinates of a point which is on an original image of the currently-projecting image and corresponds to the second feature point.

Thereby, the parameter calculation unit 307 finally calculates a parameter having the highest degree of approximation between the first and second feature points.

The degree of approximation can be obtained by calculating each difference between (i) the modified coordinates of a target second feature point (x', y') and (ii) coordinates of a point which is on an original image of the currently-projecting image and corresponds to the second feature point (x, y). The difference between the feature points may be a difference between pixels. A smaller value of the differences (a sum of square values of the differences) represents a higher degree of the approximation.

Here, since some of the correspondence relationships between the first and second feature points are not correct, such incorrect correspondence relationships can be eliminated as outliers. The outlier elimination can be performed using RANdom SAmple Consensus (RANSAC) method. For example, a correspondence relationship 601 in FIG. 11 is not correct, so that the elimination method is used to eliminate the correspondence relationship 601.

The above processing is performed for each of the shape models held in the shape model hold unit 303. After all of the shape models held in the shape model hold unit 303 have been applied with the above processing (S210 to S216), the model selection unit 306 selects a shape model that is the most suitable for the projection surface 120 from among the shape models (S218). This means is that the model selection unit 306 selects a shape model most suitable for the shape of the projection surface 120 from among the shape models held in the shape model hold unit 303, based on the correspondence relationships between the first and second feature points.

In more detail, in order to automatically select the most suitable shape model from among the shape models held in the shape model hold unit 303, a model parameter is calculated for each of the shape models using the correspondence relationships between the first and second feature points and a shape model having the highest degree of approximation between the feature points is eventually selected.

The degree of approximation is obtained by transforming the captured image using the shape model and calculating a difference between the original image of the currently-projecting image and the transformed captured image of the currently-projecting image. A smaller value of the differences (a sum of square value of the differences) represents a higher degree of the approximation. This means that the parameter calculation unit 307 calculates a model parameter for each of the shape models held in the shape model hold unit 303 and examined whether or not to be suitable for the shape of the projection surface 120, and the model selection unit 306 selects as the shape model for the projection surface 120 (hereinafter, referred to also as a "projection surface shape model"), from among the examined shape models, a shape model by which coordinates of the second feature points modified by the model shape are the most approximated to coordinates of points which are on an original image of the currently-projecting image and correspond to the second feature points.

It is also possible that a larger number of correspondence relationships between feature points based on a shape model means a higher degree of the approximation. Here, the selection of the projection surface shape model may be repeated until the number of correspondence relationships exceeds a predetermined value. In other words, the parameter calculation unit 307 calculates a model parameter for each of the shape models held in the shape model hold unit 303 and examined whether or not to be suitable for the shape of the projection surface 120. Then, the model selection unit 306 selects a shape model as the projection surface shape model from among the examined shape models. By the selected shape model, the number of certain second feature points exceeds a predetermined second threshold value. Regarding the certain second feature point, a difference between (i) coordinates of the second feature point modified by the model parameter and (ii) coordinates of a point which is on an original image of the currently-projecting image and corresponds to the second feature point is equal to or less than a predetermined first threshold value. Here, each of the first and second threshold values may be any numeral value predetermined by a user.

Thereby, even if a certain shape model is once selected erroneously for the projection surface 120 although the number of correspondence relationships is small, a more suitable shape model can be selected later when the number of correspondence relationships exceeds a predetermined number. Then, it is possible to calculate a model parameter based on the more suitable shape model.

It should be noted that the user can select the projection surface shape model from among the shape models held in the shape model hold unit 303. In other words, the model selection unit 306 selects the projection surface shape model according to a signal provided from the outside.

Then, as a correction parameter, the model parameter estimation unit 304 provides (i) the shape model most suitable for the projection surface 120 and (ii) the model parameter calculated is based on the shape model to the parameter hold unit 305 and the correction unit 108 (S220).

Then, the correction parameter calculation unit 107 completes the processing of calculating a correction parameter (S110 of FIG. 5).

It should be noted that the processing of selecting the projection surface shape model and calculating a model parameter may be performed on every image in moving images or every several seconds or minutes.

Figure 12:
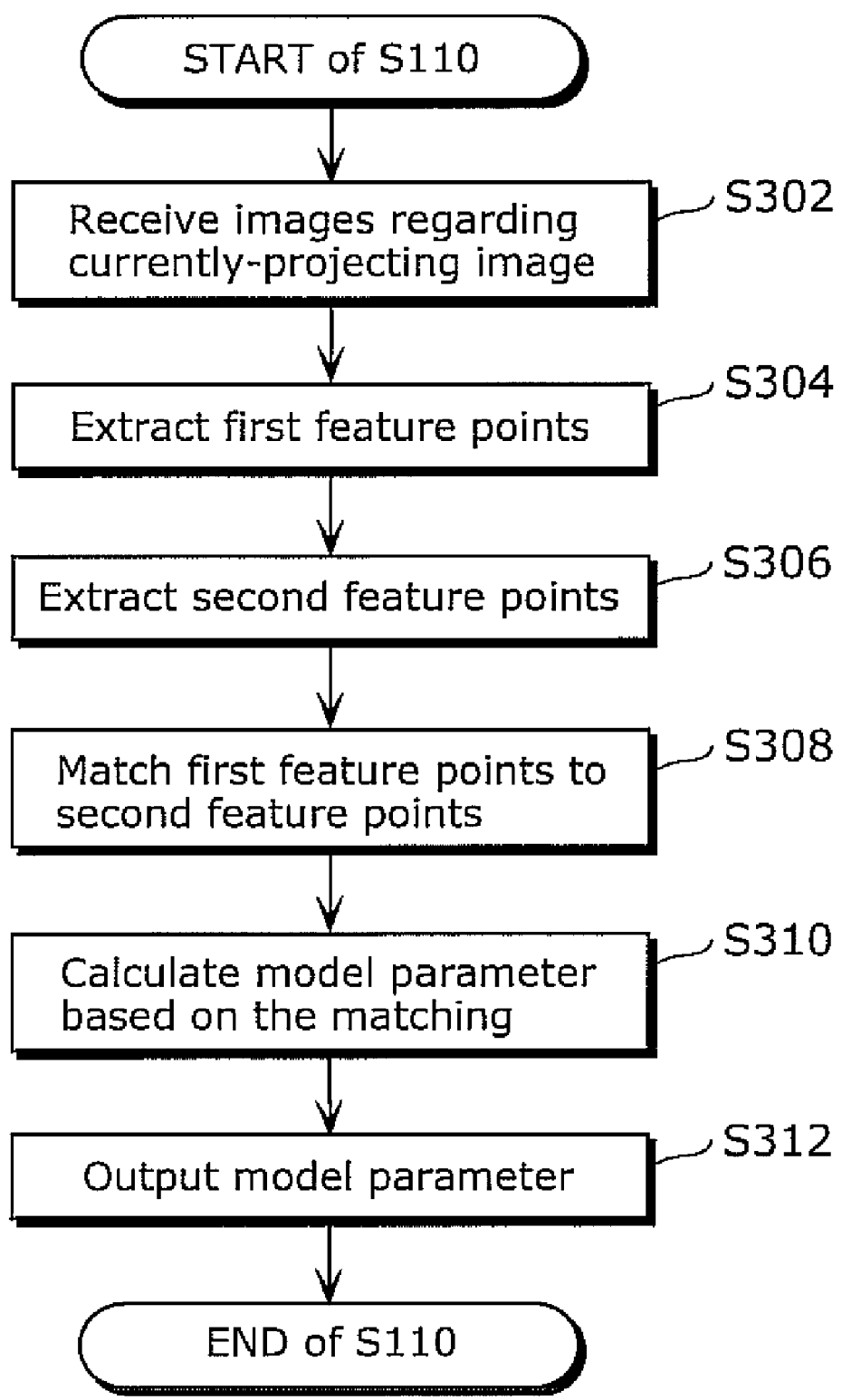
FIG. 12 is a flowchart of a modification of processing performed by the correction parameter calculation unit to calculate is the correction parameter according to the first embodiment of the present invention.

The following describes a modification of the Step 110 of FIG. 5 performed by the correction parameter calculation unit 107 to calculate a correction parameter, with reference to FIG. 12. In this modification, when the shape of the projection surface 120 is hardly changed in the middle of projecting images (in other words, when the shape of the projection surface 120 is hardly varied as time passes), the model selection unit 306 selects only one projection surface shape model for all currently-projecting images from among the shape models held in the shape model hold unit 303, and the parameter calculation unit 307 calculates a model parameter for each currently-projecting image using the same shape model. Thereby, a model parameter is calculated for each currently-projecting image depending on (i) the shape of the projection surface 120 and (ii) a change in the positional relationship between the projection surface 120 and the projector 100 which occurs in the middle of projecting images.

In the flowchart of FIG. 9 of the above-described first embodiment, the projection surface shape model is selected for each currently-projecting image, so that a shape model that has been selected once can be changed to another for another image. Therefore, when a shape of the projection surface 120 is varied as time passes, the projection surface shape models selected by the model parameter estimation unit 304 are also varied depending on various shapes of the projection surface 120. On the other hand, there is a situation where the shape of the projection surface 120 is hardly varied as time passes while a positional relationship between the projector 100 and the projection surface 120 is varied as time passes. In this modification, when the shape of the projection surface 120 is hardly varied as time passes while a positional relationship between the projector 100 and the projection surface 120 is varied as time passes, the model selection unit 304 fixes a projection surface shape model for all currently-projecting images, and calculates a model parameter for each currently-projecting image using the fixed projection surface shape model.

FIG. 12 is a flowchart of the modification of the Step S110 of FIG. 5 performed by the correction parameter calculation unit 107 to calculate a correction parameter. Here, it is assumed that from among the shape models held in the shape model hold unit 303 the model selection unit 306 has previously selected, as a projection surface shape model used for every currently-projecting image, a certain shape model from among the shape models held in the shape model hold unit 303. The certain shape model is hereinafter referred to as a "fixed shape model". It should be noted that the model selection unit 306 may select the fixed shape model according to the flowchart of FIG. 9 or according to a signal provided from the outside.

Now, an image is projected and, the feature point extraction unit 301 receives images (S302) and extracts first feature points and second feature points from the received images (S304 and S306). Then, the feature point match unit 302 matches the first and second feature points between the captured image and the original image (S308). The above Steps S302 to S308 of FIG. 12 are identical to the Steps S202 to S208 of FIG. 9, so that the identical steps are not explained again below.

Next, the parameter calculation unit 307 calculates a model parameter using the fixed shape model (S310). The calculation of the model parameter is the same as Step 214 of FIG. 9, so that details of the calculation are not explained again.

Then, the model parameter estimation unit 304 provides the model parameter calculated by the parameter calculation unit 307 to the parameter hold unit 305 and the correction unit 108 (S312), and the modification of Step S110 of FIG. 5 is completed. Thereby, in this modification, when the shape of the projection surface 120 is hardly changed in the middle of projecting images, the model parameter can be calculated for each currently-projecting image depending on (i) the shape of the projection surface 120 and (ii) a change in the positional relationship between the projection surface 120 and the projector 100 which occurs in the middle of projecting images.

As described above, the projector 100 according to the first embodiment of the present invention determines correspondence relationships of feature points between (i) a projection target image and (ii) a captured image generated by projecting the projection target image on the projection surface 120 and capturing the projected projection target image, and detects shape distortion of the projection surface 120 using the correspondence relationships. Then, the projector 100 corrects an original image of a next image to be projected, by applying a correction reversed from the shape distortion onto the original image, and projects the corrected image. Thereby, the projector 100 can provide a user with a projected image without distortion from a view of the user. This means that the projector 100 can provide the user with image projection having high reconstructability. The shape distortion is detected by calculating a model parameter using a corresponding projection surface shape model.

Therefore, the projector 100 according to the present invention can detect screen distortion of the projection surface using feature points of a currently-projecting image, before projecting a next image on the projection surface 120 such as a screen. Therefore, the user does not need to detect shape distortion of the projection surface 120 by projecting a patterned image (test image) or examining the projection surface 120 itself, before projecting images to be viewed. Further, the projector 100 can detect an amount of the shape distortion of the projection surface 120 and thereby correct an image to be projected according to the detected amount of the shape distortion without interrupting user's viewing of projected images, even if the shape of the projection surface 120 or a positional relationship between the projection surface 120 and the projector 100 is changed in the middle of projecting images. Furthermore, since the projector 100 detects the shape distortion for each currently-projecting image by calculating a model parameter for each currently-projecting image using a corresponding projection surface shape model, the projector 100 can appropriately correct images to be projected without causing discomfort in user's viewing of the images, even if moving images consisting of quite different images are continuously projected as time passes thereby changing image correction methods frequently.

Second Embodiment

Furthermore, by recording a program (computer program), which realizes the projector 100 described in the first embodiment, onto a recording medium (computer-readable recording medium) such as a flexible disk, it is possible to easily perform the processing as described in the first embodiment in an independent computer system.

Figure 13A:
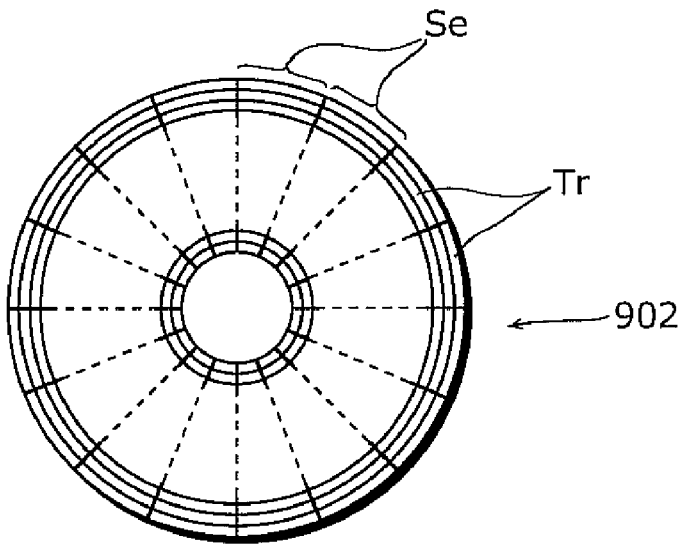
FIG. 13A is an explanatory diagram of a second embodiment of the present invention.
Figure 13B:
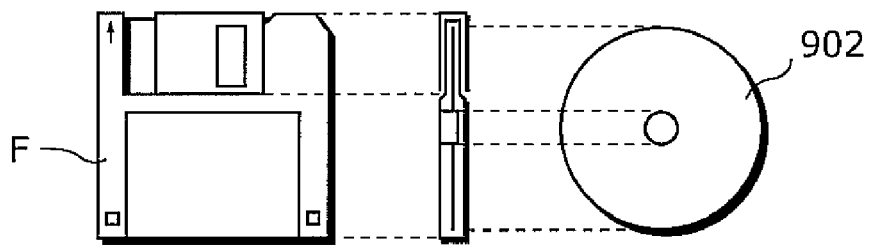
FIG. 13B is another explanatory diagram of the second embodiment of the present invention.
Figure 13C:
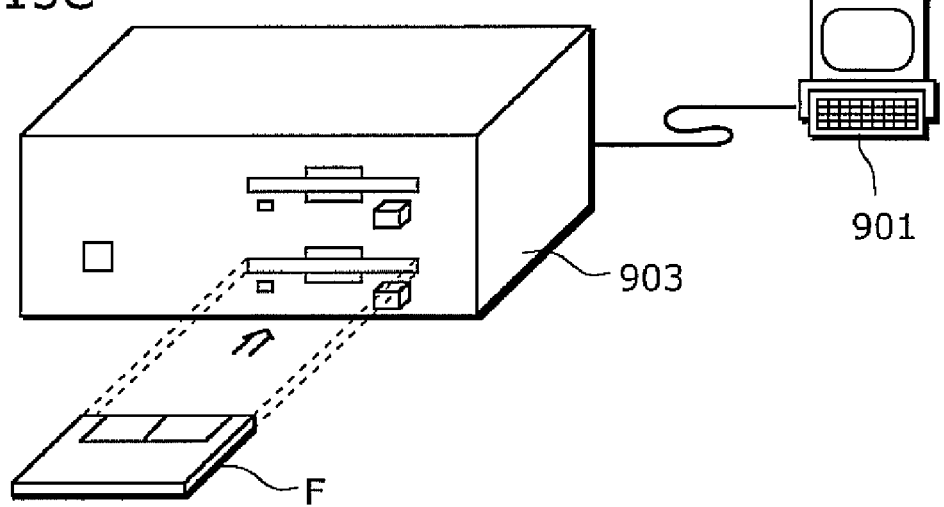
FIG. 13C is still another explanatory diagram of second embodiment of the present invention.

FIGS. 13A to 13C are explanatory diagrams according to the second embodiment of the present invention. More specifically, FIGS. 13A to 13C are explanatory diagrams of a case where the processing as described in the first embodiment is perform by the computer system, using a recording medium such as a flexible disk 902 which stores a program for realizing the projector 100 described in the first embodiment.

FIG. 13A shows an example of a physical format of the flexible disk 902, as a recording medium body. FIG. 17B shows a front view and a cross-sectional view of a case in which the flexible disk 902 is contained, and a view of the flexible disk 902 itself.

As shown in FIG. 13A, on a surface of the disk 902, a plurality of tracks Tr are formed concentrically from the outer periphery to the inner periphery, and each track is segmented into sixteen sectors Se in an angular direction. Therefore, in the flexible disk 902 storing the above program, the projection method as the program is recorded in an area allocated on the above flexible disk 902.

Moreover, FIG. 13C shows a structure for recording and reproducing the above program on the flexible disk 902. When the program is recorded onto the flexible disk 902, the projection method as the program is written from a computer system 901 via a flexible disk drive 903. When the above projection method is constructed in the computer system using the program in the flexible disk 902, the program is read out from the flexible disk 902 via the flexible disk drive 903 and transferred to the computer system 901.

It should be noted that the above has described that the recording medium is assumed to be the flexible disk 902, but the above can also be performed using an optical disk. It should also be noted that the recording medium is not limited to the above mediums, but any other mediums, such as an IC card and a ROM cassette, can be also used, as far as the mediums can record the program.

It should also be noted that the present invention is not limited to the above first and second embodiments but various variations and modifications are possible in the embodiments without departing from the scope of the present invention.

For example, the functional blocks in the block diagrams of FIGS. 1 and 3 may be implemented into a LSI which is an integrated circuit. These functional blocks may be integrated separately, or a part or all of them may be integrated into a single chip.

Here, the integrated circuit is referred to as a LSI, but the integrated circuit can be called an IC, a system LSI, a super LSI or an ultra LSI depending on their degrees of integration.

The technique of integrated circuit is not limited to the LSI, and it may be implemented as a dedicated circuit or a general-purpose processor. It is also possible to use a Field Programmable Gate Array (FPGA) that can be programmed after manufacturing the LSI, or a reconfigurable processor in which connection and setting of circuit cells inside the LSI can be reconfigured.

Furthermore, if due to the progress of semiconductor technologies or their derivations, new technologies for integrated circuits appear to be replaced with the LSIs, it is, of course, possible to use such technologies to implement the functional blocks as an integrated circuit. For example, biotechnology and the like can be applied to the above implementation.

INDUSTRIAL APPLICABILITY

The projector according to the present invention is suitable for a projector projecting images on a projection surface such as a screen, having advantages of appropriately correcting shapes of images projected on a projection surface without interrupting user's viewing of the projected images and without causing discomfort in the viewing, even if a shape of the projector surface or a position relationship between the projection surface and the projector is changed in the middle of the projection of the viewing images, or even if moving images consisting of quite different images are continuously projected as time passes thereby changing image correction methods frequently.

What is claimed is:
1. A projector that projects inputted original images on a projection surface, said projector comprising;
    an image capturing unit configured to capture an image of a projection target image projected by said projector on the projection surface, the projection target image being an original image to be projected or a corrected image generated by correcting an original image;
    a shape model hold unit configured to hold shape models each expressing a corresponding predetermined type of a shape;
    a model selection unit configured to select, as a projection surface shape model, a shape model expressing a type of a shape of the projection surface from among the shape models held in said is shape model hold unit based on correspondence relationships between first feature points on the projection target image and second feature points on the image captured by said image capturing unit;
    a parameter calculation unit configured to calculate a model parameter using the projection surface shape model based on correspondence relationships between the first feature points on the projection target image and the second feature points on the image captured by said image capturing unit in order to approximate the image captured by said image capturing unit to the original image, the model parameter being used to approximate a shape of the projection surface shape model to the shape of the projection surface and indicating a positional relationship between the projection surface and said projector, and the calculation being performed for each of projection target images including the projection target image;
    a correction unit configured to, when the model parameter is calculated, correct another original image to be projected using the projection surface shape model and the model parameter; and a projection unit configured to project, as another projection target image, the corrected image corrected by said correction unit on the projection surface.

2. The projector according to claim 1,
wherein said parameter calculation unit is configured to repeatedly calculate the model parameter until coordinates of the second feature points are modified using the projection surface shape model and the model parameter to be approximated to coordinates of points which are on the original image and correspond to the second feature points.

3. The projector according to claim 1,
wherein said parameter calculation unit is configured to repeatedly calculate the model parameter until the image captured by said image capturing unit is approximated to an image enlarged or reduced from the original image.

4. The projector according to claim 1,
wherein said model selection unit configured to select a single projection surface shape model from among the shape models held in said shape model hold unit for the projection target images, and
said parameter calculation unit is configured to calculate the model parameter using the single projection surface shape model for each of the projection target images, so that the calculation for the projection target images being performed depending on (i) the shape of the projection surface and (ii) a change in the positional relationship between the projection surface and said projector.

5. The projector according to claim 1,
wherein said parameter calculation unit is configured to calculate the model parameter using a shape model assuming that the shape model is the projection surface shape model to be selected from among the shape models held in said shape model hold unit, and
said model selection unit is configured to select the shape model as the projection surface shape model, so that (i) the number of certain points among the second feature points which are modified using the model parameter corresponding to the selected shape model exceeds a second threshold value and that (ii) a difference between (ii-1) coordinates of each of the certain points and (ii-2) coordinates of a point which is on the original image and corresponds to the each of the certain points is equal to or less than a first threshold value.

6. The projector according to claim 1,
wherein said parameter calculation unit is configured to calculate a plurality of the model parameters using a plurality of shape models assuming that one shape model of the plurality of shape models is the projection surface shape model to be selected from among the shape models held in said shape model hold unit, and
said model selection unit is configured to select the one shape model from among the plurality of shape models as the projection surface shape model, so that coordinates of the second feature points modified using the model parameter corresponding to the one shape model are most approximated to coordinates of points which are on the original image and correspond to the second feature points.

7. The projector according to claim 1,
wherein said model selection unit is configured to select the projection surface shape model according to a signal provided from outside of said projector.

8. The projector according to claim 1,
wherein the shape model hold unit is configured to hold, as the shape models, at least one of a projection transformation model, a cylinder model, a sphere model, and a thin plate spline model.

9. A projection method of projecting inputted original images on a projection surface, said projection method comprising;
capturing an image of a projection target image projected by a projector on the projection surface, the projection target image being an original image to be projected or a corrected image generated by correcting an original image;
selecting, as a projection surface shape model, a shape model expressing a type of a shape of the projection surface from among the shape models each expressing a corresponding predetermined type of a shape based on correspondence relationships between first feature points on the projection target image and second feature points on the image captured in said capturing;
calculating a model parameter using the projection surface shape model based on correspondence relationships between the first feature points on the projection target image and the second feature points on the image captured in said capturing in order to approximate the image captured in said capturing to the original image, the model parameter being used to approximate a shape of the projection surface shape model to the shape of the projection surface and indicating a positional relationship between the projection surface and the projector, and the calculation being performed for each of projection target images including the projection target image;
correcting another original image to be projected using the projection surface shape model and the model parameter, when the model parameter is calculated; and
projecting, as another projection target image, the corrected image corrected in said correcting on the projection surface.

10. An integrated circuit which controls a projector that projects inputted original images on a projection surface, said integrated circuit comprising;
an image capturing unit configured to capture an image of a projection target image projected by said projector on the projection surface, the projection target image being an original image to be projected or a corrected image generated by correcting an original image;
a shape model hold unit configured to hold shape models each expressing a corresponding predetermined type of a shape;
a model selection unit configured to select, as a projection surface shape model, a shape model expressing a type of a shape of the projection surface from among the shape models held in said shape model hold unit based on correspondence relationships between first feature points on the projection target image and second feature points on the image captured by said image capturing unit;
a parameter calculation unit configured to calculate a model parameter using the projection surface shape model based on correspondence relationships between the first feature points on the projection target image and the second feature points on the image captured by said image capturing unit in order to approximate the image captured by said image capturing unit to the original image, the model parameter being used to approximate a shape of the projection surface shape model to the shape of the projection surface and indicating a positional relationship between the projection surface and said projector, and the calculation being performed for each of projection target images including the projection target image;

a correction unit configured to, when the model parameter is calculated, correct another original image to be projected using the projection surface shape model and the model parameter; and a projection unit configured to project, as another projection target image, the corrected image corrected by said correction unit on the projection surface.

11. A computer program recorded on a computer-readable recording medium to project images on a projection surface, said computer program causing a computer to execute;

capturing an image of a projection target image projected by a projector on the projection surface, the projection target image being an original image to be projected or a corrected image generated by correcting an original image;

selecting, as a projection surface shape model, a shape model expressing a type of a shape of the projection surface from among the shape models each expressing a corresponding predetermined type of a shape based on correspondence relationships between first feature points on the projection target image and second feature points on the image captured in said capturing;

calculating a model parameter using the projection surface shape model based on correspondence relationships between the first feature points on the projection target image and the second feature points on the image captured in said capturing in order to approximate the image captured in said capturing to the original image, the model parameter being used to approximate a shape of the projection surface shape model to the shape of the projection surface and indicating a positional relationship between the projection surface and the projector, and the calculation being performed for each of projection target images including the projection target image;

correcting another original image to be projected using the projection surface shape model and the model parameter, when the model parameter is calculated; and projecting, as another projection target image, the corrected image corrected in said correcting on the projection surface.

* * * * *